United States Patent [19]

Nakai et al.

[11] Patent Number: 4,911,756
[45] Date of Patent: Mar. 27, 1990

[54] HARD SINTERED COMPACT FOR TOOLS

[75] Inventors: Tetsuo Nakai; Mitsuhiro Goto, both of Itami, Japan

[73] Assignee: Sumitomo Electric Industries, Ltd., Osaka, Japan

[21] Appl. No.: 230,618

[22] Filed: Aug. 9, 1988

Related U.S. Application Data

[63] Continuation-in-part of Ser. No. 946,522, Dec. 24, 1986, abandoned.

[30] Foreign Application Priority Data

Dec. 28, 1985 [JP] Japan .................................. 60-297545

[51] Int. Cl.$^4$ ............................................. C22C 29/04
[52] U.S. Cl. ........................................ 75/238; 75/241; 75/244; 419/12; 419/13; 419/16; 419/18; 419/23; 419/139; 419/48
[58] Field of Search ................... 75/238, 241, 244; 419/12, 13, 16, 18, 23, 39, 48

[56] References Cited

U.S. PATENT DOCUMENTS

| | | | |
|---|---|---|---|
| 4,566,905 | 1/1986 | Akashi et al. | 75/244 |
| 4,647,546 | 3/1987 | Hall, Jr. et al. | 501/96 |
| 4,693,746 | 9/1987 | Nakai et al. | 75/238 |
| 4,696,352 | 9/1987 | Buljan et al. | 175/57 |

FOREIGN PATENT DOCUMENTS

| | | |
|---|---|---|
| 0155696 | 9/1985 | European Pat. Off. |
| 3044945 | 9/1981 | Fed. Rep. of Germany |
| 2375155 | 7/1978 | France |
| 2048956 | 12/1980 | United Kingdom |

OTHER PUBLICATIONS

Japanese Patent Abstract No.: JP-A-58/164750, vol. 7, No. 285 (C-201) [1430] Dec. 20, 1983.
Japanese Patent Abstract No.: JP-A-58/113348, vol. 7, No. 219, (C-188) [1364] Sep. 29, 1983.
Japanese Patent Abstract No.: JP-A-58/113349, vol. 7, No. 219 (C-188) [1364 Sep. 29, 1983.

Primary Examiner—Stephen J. Lechert, Jr.
Assistant Examiner—Nina Bhat
Attorney, Agent, or Firm—W. G. Fasse; D. H. Kane, Jr.

[57] ABSTRACT

A sintered compact is obtained by sintering a mixture containing about 50 to 75 percent by volume of cubic boron nitride and about 25 to 50 percent of a binder under cBN-stable superhigh pressure conditions. The binder contains about 20 to 50 percent by weight of Al and one or more Ti compounds selected from the group consisting of $TiN_z$, $Ti(C,N)_z$, $TiC_z$, $(Ti,M)C_z$, $(Ti,M)(C,N)_z$ and $(Ti,M)N_z$, wherein M indicates a transition metal of the group IVa, Va or VIa of the periodic table excepting Ti, and wherein z is within a range of $0.5 \leq z \leq 0.85$. The atomic ratio of the content of Ti to that of the transition metal M in the binder is within the range of about $$2/1 \leq Ti/M \leq 97/3.$$

The binder further contains tungsten or one or more tungsten compounds, whereby the total tungsten concentration in the binder is about 4 to 40 percent by weight.

16 Claims, 1 Drawing Sheet

HARD SINTERED COMPACT FOR TOOLS

CROSS REFERENCE TO RELATED APPLICATION

The present application is a Continuation-In-Part application of my copending U.S. Ser. No. 946,522, filed in the U.S.A. on Dec. 24, 1986 now abandoned.

FIELD OF THE INVENTION

The present invention relates to an improvement in a hard sintered compact for a tool which is prepared of cubic boron nitride (hereinafter referred to as cBN).

DESCRIPTION OF THE PRIOR ART

Cubic boron nitride is the hardest substance next to diamond, and sintered compacts thereof are used for various cutting tools. Japanese Patent Laying-Open Gazette No. 77811/1978 discloses an example of such a cBN sintered compact applicable to a cutting tool.

The prior art discloses a hard sintered compact which mainly contains 80 to 40 percent by volume of cubic boron nitride and a residue of carbide, nitride, boride or silicide of a transition metal selected from groups IVb, Vb and VIb of the periodic table, a mixture thereof, or a mutual solid-solution compound thereof, or those further comprising Si and/or Al. Such a compound has a continuous bonding phase in the structure of the sintered compact. This hard sintered compact for a tool employs carbide, nitride, boride or silicide of a transition metal selected from the groups IVb, Vb and VIb of the periodic table, namely a mutual solid-solution compound thereof or the like. Such compounds are relatively hard and have high melting points. Therefore, sintered compacts prepared from these compounds generally provide a high performance in their application to cutting tools.

It has been confirmed that the aforementioned commercially available hard sintered compact for a tool as disclosed in Japanese Patent Laying-Open Gazette No. 77811/1978, generally has a high performance when the same is applied to a cutting tool.

However, the known sintered compact still has the following disadvantage when the same is applied to a cutting tool, depending on the usage.

When a tool of the cBN sintered compact is used for an intermittently interrupted cutting operation on a hardened steel which has a key groove or a hole, the cutting edge of the cBN sintered compact is exposed to high stress and tends to break. The breakage of the cutting edge may occur due to a lack of strength of the cutting edge and due to crater wear which takes place at the rake surface of the tool and causes sharpening of the cutting edge, whereby the tool is broken.

Such breaking of the cutting edge of the tool in the aforementioned usage shows that the hard sintered compact for a tool itself is insufficient in strength and inferior in crater wear resistance.

SUMMARY OF THE INVENTION

Accordingly, it is an object of the present invention to provide a hard sintered compact for a tool which is superior in strength and wear resistance to the aforementioned conventional sintered compact of cubic boron nitride.

In order to attain the aforementioned object or improvement, the inventors have discovered that a sintered compact obtained by mixing approximately 50 to 75 percent by volume of cBN and a binder containing approximately 20 to 50 percent by weight of Al and one or more Ti compounds selected from a group of $TiN_z$, $Ti(C,N)_z$, $TiC_z$, $(Ti,M)C_z$, $(Ti,M)(C,N)_z$ and $(Ti,M)N_z$, wherein M indicates a transition metal element of the group IVa, Va or VIa of the periodic table excepting Ti, and z is within a range of $0.5 \leq z \leq 0.85$. The atomic ratio of Ti to M is within the range:

$$2/1 \leq Ti/M \leq 97/3.$$

The binder further contains tungsten in the form of one or more W compounds selected from WC, $(Ti,W)C_z$, $(Ti,W)(C,N)_z$, $(Ti,W)N_z$, $(Ti,W,M)C_z$, $(Ti,W,M)(C,N)_z$ and $(Ti,W,M)N_z$, of which the total concentration in the binder is about 4 to 40 weight percent. This mixture is sintered under high pressure conditions in which cBN is stable and higher in strength than and superior in abrasion resistance to the conventional sintered compact of cubic boron nitride. The starting mixture prior to sintering has the above noted atomic ratios of Ti, M, W, C, and N. However, analyzing these atomic ratios after the sintering is very difficult. Therefore, the notation for the sintered compact should be as follows, without the atomic ratio subscript z.

The sintered compact according to the present invention contains cBN, TiN, Ti(C,N), TiC, (Ti,M)C, (Ti,M)(C,N) and (Ti,M)N, titanium boride, aluminum boride, aluminum nitride, tungsten compound and/or tungsten. The bonding phases are continuous in the structure.

According to the present invention, a hard cBN sintered compact is obtained by mixing a powder containing 50 to 75 percent by volume of cubic boron nitride powder and a residue of a binder.

The aforementioned cBN content is selected for the following reasons:

When the cBN content is less than about 50 percent by volume, hardness of the sintered compact is lowered as hereinabove described, whereby plastic flow takes place at the cutting edge to break the same. When, on the other hand, the cBN content exceeds about 75 percent by volume, wear resistance is abruptly lowered to increase crater formation, whereby the cutting edge is sharpened and broken. In the case that the cBN powder has an average particle size larger than 2 $\mu$m, the strength and hardness are lowered in a sintered compact containing less than about 65 percent by volume of cBN particles. Thus, in the case of using cBN particles larger than 2 $\mu$m in average particle size, the cBN content in the mixed powder must be about 65 to 75 percent by volume. When on the other hand, cBN particles larger than 30 $\mu$m in particle size are used, the cutting edge tends to break by chipping of the cBN particles themselves. Thus, it is not preferable to employ cBN particles larger than 30 $\mu$m in particle size.

When, on the other hand, only cBN particles smaller than 2 $\mu$m in particle size are employed, it is impossible to obtain a uniform sintered compact from a mixed powder containing cBN particles in excess of about 65 percent by volume. However, when cBN particles smaller than 2 $\mu$m and preferably smaller than 1 $\mu$m in particle size are employed, a uniformly structured sintered compact of high hardness can be obtained when the mixed powder contains about 50 to 65 percent by volume of such cBN powder.

According to the present invention, further, the binder mainly contains one or more components selected from $TiN_z$, $Ti(C,N)_z$, $TiC_z$, $(Ti,M)C_z$, $(Ti,M)(C,N)_z$ and $(Ti,M)N_z$, wherein M indicates a transition metal element of the group IVa, Va or VIa of the periodic table excepting Ti, and wherein z is within a range of $0.5 \leq z \leq 0.85$. Namely, the binder is a simple substance or a solid solution of carbide, nitride or carbo-nitride of Ti. Such substances contain free Ti, which easily reacts with the cBN and Al compound to strictly bond the cubic boron nitride with the bonding phases.

With the aforementioned expression of the carbide, nitride, carbo-nitride and solid solution thereof containing Ti, the value z is within the range of $0.5 \leq z \leq 0.85$ for the following reason: When the value z is less than 0.5, the sintered compact is reduced in hardness, while free Ti is decreased and the bond strength of cBN and the binder is reduced when the value z exceeds 0.85.

When the carbide, nitride or carbo-nitride of the transition metal element M selected from the groups IVb, Vb and VIb of the periodic table, is mixed with one or more components of the carbide, nitride and carbo-nitride of Ti, the binder is improved in strength and the performance is further improved in comparison with a case employing only the Ti compound as the binder.

The condition required for the Ti content in the binder is that the atomic ratio of Ti to the metal element M selected from the groups IVb, Vb and VIb of the periodic table excepting Ti is within the range:

$$2/1 \leq Ti/M \leq 97/3.$$

When the atomic ratio is less than about 2, the bond strength of the binder and cBN is reduced. When the atomic ratio is in excess of about 97/3, on the other hand, the binder is reduced in wear resistance and strength.

According to the present invention, further, the binder contains a considerable amount, namely about 20 to 50 percent by weight, of Al. This is because Al reacts with $TiN_z$, $Ti(C,N)_z$, $TiC_z$, $(Ti,M)C_z$, $(Ti,M)(C,N)_z$ or $(Ti,M)N_z$ and cBN particles in the bonding phases to produce a compound such as $TiAl_3$, AlN or $AlB_2$ thereby improving the bond strength of the bonding phases and the cBN particles. When the Al content is less than 20 percent by weight of the binder, the bond strength is reduced and the cBN particles are easily broken away, whereby the crater wear resistance is reduced. When the Al content is in excess of about 50 percent by weight, on the other hand, the content of the cBN particles is relatively decreased whereby the hardness is reduced and the cutting edge is easily broken.

However, there may be a number of preferable combinations of the Al content and the Ti component content as is apparent from the Examples as disclosed herein.

First, when the aforementioned component containing Ti is expressed by $(TiC_z,MC)_y$—$(MN)_{l-y}$ or $(Ti,M)$-$(C_y,N_{l-y})$, wherein M indicates the transition metal element selected from the groups IVa, Vb and VIb, of the periodic table excepting Ti and wherein y is within a range of $0.3 < y < 1.0$, in the case where the binder contains about 25 to 50 percent by weight of Al, one or more such compounds are preferably contained.

Second, when the binder contains about 20 to 35 percent by weight of Al, the value y in the above chemical formula is preferably within a range of $0 < y \leq 0.3$.

According to the present invention, further, the binder contains about 4 to 40 percent by weight of tungsten in the form of one or more tungsten compounds mentioned above. Such tungsten is added to improve the wear resistance, which cannot be improved if the tungsten content is less than about 4 percent by weight of the binder. When the tungsten content is in excess of about 40 percent by weight, on the other hand, the content of the Ti compound is lowered whereby the bond strength of cBN and the binder is reduced. Particularly when W is employed as M in the above chemical formula, the binder is further improved in wear resistance and strength, whereby a hard sintered compact of high quality may be obtained.

In the sintered compact according to the present invention, the bonding phase of the aforementioned binder is continuous in the structure, which is entirely uniformalized. When different-sized cBN particles are combined in the cBN powder, fine cBN particles are filled around or between coarse cBN particles, whereby the cBN content can be increased. As a result, the sintered compact is improved in strength and abrasion resistance.

In order to manufacture the sintered compact according to the present invention, about 50 to 75 percent by volume of cBN powder is mixed with about 25 to 50 percent by volume of the aforementioned binder, and the mixture is sintered at a high pressure and temperature at which cBN is stable. It is believed that free Ti or free Al present in the aforementioned $TiN_z$, $Ti(C,N)_z$, $TiC_z$, $(Ti,M)C_z$, $(Ti,M)(C,N)_z$ or $(Ti,M)N_z$ or Al added in the form of an intermetallic compound reacts with cBN to form a nitride or boride of Ti or Al through the aforementioned sintering to improve the bond strength of cBN and the binder.

Tungsten may be present in the sintered binder in the form of pure tungsten, tungsten boride or tungsten carbide (WC). Similarly, Al may be present in the form of an Al compound.

With respect to the cubic boron nitride powder as the raw material, a plurality of types of differently sized cBN particles may be mixed together as described above. Only particles smaller than 30 $\mu$m, preferably smaller than 2 $\mu$m and especially smaller than 1 $\mu$m in average particle size are to be employed.

The hard sintered compact for a tool according to the present invention is excellent in thermal conductivity, strength and wear resistance whereby the same is applicable to interrupted cutting of hardened steel and cutting cast iron or thermal resistant alloy.

The above and other objects, features, aspects and advantages of the present invention will become more apparent from the following detailed description of the present invention when taken in conjunction with the accompanying drawings.

BRIEF DESCRIPTION OF THE DRAWINGS

In order that the invention may be clearly understood, it will now be described, by way of example, with reference to the according drawings, wherein.

DETAILED DESCRIPTION OF PREFERRED EXAMPLE EMBODIMENTS AND OF THE BEST MODE OF THE INVENTION

It should be noted here that in the following tables those examples which for any reason are outside the bounds defined by the present claims, are included only as comparative examples. Thus, e.g. in Table 1 the examples aa-1 and aa-7 are comparative examples because their cBN volume content is outside the claimed range.

EXAMPLE 1

$TiN_{0.7}$, Al and WC powder were mixed in the weight ratio of 6:3:1 to be processed under vacuum at a temperature of 1200° C. for one hour. The processed material was pulverized by means of a ball and a pot of cemented carbide to prepare powder having a particle size smaller than 1 $\mu$m. Then the powder thus obtained was mixed with various cBN powder materials different in particle size in the ratios as listed in Table 1. Discs of WC-10 wt. % Co were inserted in vessels of Mo, which were then filled with the powder materials mixed as described above. Each vessel was placed in a superhigh pressure apparatus and processed under a pressure of 50 Kb and a temperature of 1350° C. for 15 minutes to obtain a sintered compact.

The structure of each sintered compact thus obtained was observed through a scanning type electron microscope, to find that cBN particles were uniformly dispersed through the binder phase.

These sintered compacts were examined by X-ray diffraction and, as a result, in addition to peaks of cBN and (Ti,W)(C,N), peaks considered as those of $TiB_2$, $AlB_2$, AlN and W were found. The atomic ratio of Ti to W measured through chemical analysis was 93:7.

Further, it was recognized that each cBN sintered compact was strongly bonded to the base material of cemented carbide.

The obtained sintered compacts were machined into tips suitable for cutting or milling tools, which tips were adapted to cut SUJ-2 steel materials ($H_{RC}$: 58 to 60) 100 mm in outer diameter each having eight holes 10 mm in diameter provided in the outer periphery at intervals of 20 mm. Table 1 also shows the results of the cutting test.

TABLE 1

| Sample | cBN Particle Size ($\mu$m) | Content (vol. %) | Result of Cutting Test |
|---|---|---|---|
| *aa-1 | 1~2 | 40 | broken after 10 min. |
| aa-2 | smaller than 1 | 50 | broken after 40 min. |
| aa-3 | smaller than 1 | 60 | not broken after cutting for 60 min. |
| aa-4 | 1~3 | 65 | not broken after cutting for 60 min. |
| aa-5 | 5~10 | 70 | not broken after cutting for 60 min. |
| aa-6 | 2~8 | 75 | broken after 50 min. |
| *aa-7 | 2~10 | 80 | broken after 10 min. |

*comparative sample; underlined parameter is outside bounds of present invention

EXAMPLE 2

Binder powder materials as listed in Table 2-1 were prepared. The binders were mixed in the volume ratio of 3:7 with cBN powder materials each containing particles of 6 to 8 $\mu$m, and in the ratio of 7:3 for cBN particle sizes smaller than 3 $\mu$m, and were then sintered under a superhigh pressure similarly to Example 1.

The structure of each sintered compact thus obtained was observed to recognize that cBN particles smaller than 3 $\mu$m in particle size were uniformly dispersed throughout the binder in voids between or around cBN particles of 6 to 8 $\mu$m in particle size.

The sintered compacts were further examined through X-ray diffraction. As a result, it was observed that the sintered compacts obtained with the binders Nos. 2, 3, 4, 5, 6, 10 and 11 shown in Table 2-1 presented peaks considered as those of $TiB_2$ and $AlB_2$ in addition to peaks of cBN and carbide, nitride and carbo-nitride containing Ti.

In the sintered compacts prepared with the binders Nos. 7, 10 and 11, further, peaks of WC were observed in addition to the first mentioned peaks.

In the sintered compact obtained with the binder No. 1 on the other hand, a peak considered as that of $Ti_3Al$ or $Al_3Ti$ was observed.

Then the respective sintered compacts thus obtained were machined into tools for cutting SKD-11 die steel ($H_{RC}$: 60) 100 mm in outer diameter and having a sectionally U-shaped groove in the outer periphery. Cutting conditions were as follows:

Cutting Speed: 110 m/min.
Depth of Cut: 0.2 mm
Feed: 0.15 mm/rev.

Table 2—2 shows the results of breaking resistance of the tips examined in the cutting test.

A round bar of SKD-11 steel ($H_{RC}$: 60) having no groove was subjected to the same cutting test under the same conditions for 20 minutes, to evaluate crater wear resistance or abrasion resistance. Table 2—2 also shows these results.

TABLE 2

| Binder No. | Composition of Binder | | Atomic Ratio Ti:M |
|---|---|---|---|
| *1 | $60(Ti_{0.9},Zr_{0.1})C_{0.4}$ | 20WC 20Al | 81.9:18.1 = 4.52 |
| 2 | $60(Ti_{0.9},Zr_{0.1})N_{0.5}$ | 10WC 30Al | 85.9:14.1 = 6.09 |
| 3 | $50(Ti_{0.95},Hf_{0.05})(C_{0.5},N_{0.2})$ | 15WC 35Al | 85.7:14.3 = 5.99 |
| 4 | $50(Ti_{0.9},Ta_{0.05},W_{0.05})(C_{0.1},N_{0.5})$ | 10WC 40Al | 83.2:16.8 = 4.95 |
| 5 | $50(Ti_{0.8},Nb_{0.1},Mo_{0.1})(C_{0.4},N_{0.3})$ | 5WC 45Al | 77.2:22.8 = 3.39 |
| 6 | $50(Ti_{0.7},V_{0.2},Cr_{0.1})C_{0.8}$ | 5WC 45Al | 67.9:32.1 = 2.12 |
| *7 | $50(Ti_{0.6},W_{0.4})(C_{0.3},N_{0.3})$ | 10WC 40Al | 53.9:46.1 = 1.17 |
| *8 | $30(Ti_{0.8},W_{0.2})(C_{0.2},N_{0.5})$ | 10WC 60Al | 70.1:29.9 = 2.34 |
| *9 | $20(Ti_{0.9}W_{0.1})C_{0.6}$ | 50WC 30Al | 46.8:53.2 = 0.88 |
| *10 | $30(Ti_{0.9},Zr_{0.1})N_{0.5}$ | 45WC 25Al | 60.6:39.4 = 1.54 |
| 11 | $35(Ti_{0.9},Zr_{0.1})(C_{0.2},N_{0.5})$ | 30WC 35Al | 69.9:30.1 = 2.32 |

TABLE 2-continued

| Binder No. | Composition of Binder | | | Atomic Ratio Ti:M |
|---|---|---|---|---|
| *12 | 89(Ti,C$_{0.7}$) | 3WC | 8Al | 99.0:1.0 = 99.00 |

*Comparative sample; underlined parameters are outside of bounds of invention

TABLE 2-2

| Binder No. | Breaking Resistance (Cutting Time to Breaking) | Abrasion Resistance (Crater (μm)) |
|---|---|---|
| *1 | 30 sec. | 60 |
| 2 | 25 min. | 30 |
| 3 | 30 min. | 28 |
| 4 | 20 min. | 33 |
| 5 | 28 min. | 35 |
| 6 | 18 min. | 32 |
| *7 | 2 min. | 41 |
| *8 | 1 min. | 65 |
| *9 | 45 sec. | 35 |
| *10 | 15 min. | 25 |
| 11 | 23 min. | 26 |
| *12 | 10 sec. | 70 |

*Comparative sample; Binder No. 10 is a border line case near the bounds of the invention.

EXAMPLE 3

Powder materials a listed in Table 3-1 were mixed in the prescribed ratios to be processed in a vacuum at a temperature of 1350° C. for one hour. These materials were pulverized by means of a ball and a pot of cemented carbide. Then the obtained powder materials were mixed with cBN powder materials of 1 to 2 μm in particle size in the volume ratio of 4:6, and the mixed powder materials were filled into Mo vessels. Each vessel was placed in a high pressure apparatus to be held at a temperature of 1400° C. and a pressure of 50 Kb for 20 minutes for forming a sintered compact.

The structure of each sintered compact thus obtained was observed by SEM, to find that cBN particles were uniformly dispersed throughout the binder. Each sintered compact was further examined through X-ray diffraction. As a result, observed peaks were considered to be those of cBN, (Ti,W)N or (TiW)C, TiB$_2$, AlB$_2$ or AlN and boride of W.

Cutting tools were prepared using the aforementioned sintered compacts, to cut SKD-11 steel materials (H$_{RC}$: 58 to 60) 100 mm in outer diameter and having a groove 20 mm in width in the outer periphery. Cutting conditions were identical to those of Example 1. Table 3-2 shows the results of the cutting test.

TABLE 3-1

| Sample No. | Composition of Powder (wt. %) | | | Atomic Ratio of Ti:M |
|---|---|---|---|---|
| *aa-8 | 85TiN$_{0.8}$ | 8TiAl$_3$ | 7WC | 97.7:2.3 = 42.48 |
| aa-9 | 25TiC$_{0.7}$ | 65TiAl$_3$ | 10WC | 95.0:5.0 = 19.00 |
| aa-10 | 55TiN$_{0.85}$ | 35TiAl$_3$ | 10WC | 96.0:4.0 = 24.00 |
| *aa-11 | 70TiC$_{0.87}$ | 23Al | 7WC | 97.1:2.9 = 33.48 |

*Comparative sample; underlined parameters are outside of bounds of invention.

TABLE 3-2

| Sample No. | Result of Cutting Test |
|---|---|
| *aa-8 | broken in 4 min. |
| aa-9 | broken in 10 min. |
| aa-10 | broken in 40 min. |
| *aa-11 | broken in 5 min. |

*Comparative sample

EXAMPLE 4

Mixed powder materials were prepared of carbide, nitride and carbo-nitride powder containing Ti and aluminum, and tungsten carbide powder as listed in Table 4. Then cBN powder materials each containing particles of 4 to 8 μm, 2 to 4 μm and smaller than 2 μm in particle size in the ratio of 3:5:2 respectively were mixed with the aforementioned binder powder materials in the ratios as shown in Table 4. Then the obtained mixed powder materials were placed into Mo vessels, each of which was heated in a vacuum furnace at a vacuum of 10$^{-4}$ Torr at a temperature of 1000° C. for 20 minutes for degassing. Then the mixed powder materials were sintered at a pressure of 55 Kb and at a temperature of 1400° C.

The structure of each sintered compact thus obtained was examined through a scanning electron microscope. It was observed that cBN particles smaller than 4 μm in particle size were present around or in voids between cBN particle 4 to 8 μm in particle size throughout the binder.

Each sintered compact was identified by means of X-ray diffraction. It was observed that each compact exhibited peaks considered to be those of AlB$_2$, TiB$_2$, TiN, W and WB in addition to peaks of cBN and carbide or carbo-nitride containing Ti. Further, the atomic ratio Ti:M of Ti to the metal M of the group IVb, Vb or VIb excepting Ti in each sintered compact was surveyed through chemical analysis. The atomic ratio Ti:M was 82:28 in the samples ba-1, ba-2, ba-3, ba-4, ba-6 and ba-7 while the ratio was 93:7 in the sample ba-5.

Figure 1:
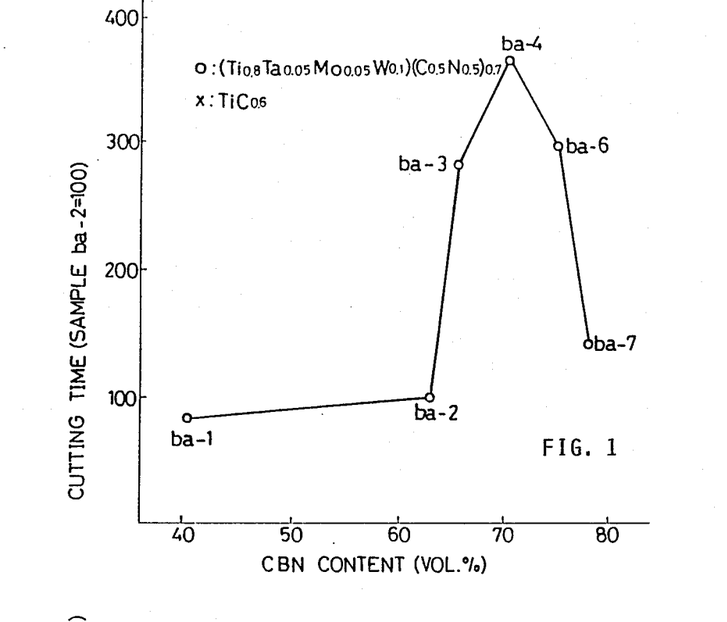
FIG. 1 is a graph showing the results of a cutting test based on Example 4.

Then cutting tips were made from the sintered compacts, to cut SKD-11 steel materials (H$_{RC}$: 59) each being in the form of a cylinder having four sectionally U-shaped grooves 10 mm wide in the outer periphery. Cutting conditions were as follows:
Cutting Speed: 100 m/min.
Depth of Cut: 0.2 mm
Feed: 0.1 mm/rev.
Type: Dry
FIG. 1 shows the results of the cutting test.

TABLE 4

| Sample | cBN Content vol. % | WC in Composition of Ti Component in Binder | Contents of Al and Binder wt. % |
|---|---|---|---|
| *ba-1 | 40 | (Ti$_{0.8}$,Ta$_{0.05}$,Mo$_{0.05}$, W$_{0.1}$)(C$_{0.5}$,N$_{0.5}$)$_{0.7}$ | |
| ba-2 | 63 | (Ti$_{0.8}$,Ta$_{0.05}$,Mo$_{0.05}$, W$_{0.1}$)(C$_{0.5}$,N$_{0.5}$)$_{0.7}$ | |
| ba-3 | 65 | (Ti$_{0.8}$,Ta$_{0.05}$,Mo$_{0.05}$, W$_{0.1}$)(C$_{0.5}$,N$_{0.5}$)$_{0.7}$ | Al:28% |
| ba-4 | 70 | (Ti$_{0.8}$,Ta$_{0.05}$,Mo$_{0.05}$, W$_{0.1}$)(C$_{0.5}$,N$_{0.5}$)$_{0.7}$ | WC:15% |
| ba-5 | 70 | TiC$_{0.6}$ | |
| ba-6 | 75 | (Ti$_{0.8}$,Ta$_{0.05}$,Mo$_{0.05}$, W$_{0.1}$)(C$_{0.5}$,N$_{0.5}$)$_{0.7}$ | |

TABLE 4-continued

| Sample | cBN Con-vol. % | Composition of Ti Component in Binder | WC in Binder wt. % | Contents of Al and |
|---|---|---|---|---|
| *ba-7 | 78 | $(Ti_{0.8},Ta_{0.05},Mo_{0.05},\underline{W_{0.1}})(C_{0.5},N_{0.5})_{0.7}$ | | |

*Comparative sample; underlined parameters are outside of bounds of invention.

EXAMPLE 5 cBN powder materials obtained by mixing cBN particles of different sizes in the ratios shown in Table 5-1 were mixed with binder powder materials as further listed in Table 5-1, to obtain sintered compacts similarly to Example 4.

The sintered compacts thus obtained were identified through X-ray diffraction. It was observed that the compacts exhibited peaks considered to be those of $AlB_2$, $AlN$, $TiB_2$ and $WB_2$ in addition to peaks of cBN and $(Ti,W)(C,N)$ in the samples ba-8, ba-9, ba-10, ba-11 and ba-12. In the sintered compact of the sample ba-13, peaks of cBN, $(Ti,W)(C,N)$, $AlB_2$, $AlN$ and $TiB_2$ were observed.

In each of the samples ba-8 to ba-11, the total atomic ratio of Ti to the metal M of the group IVa, Va or VIa of the periodic table excepting Ti was 91:9. On the other hand, the atomic ratio was 55:45 in the sintered compact of the sample ba-12, while the ratio was 97.4:2 6 in the sintered compact of the sample ba-13. Thus, the samples ba-12 and ba-13 are outside of the Ti:M range of the invention and are included as comparative reference samples.

Then the structure of each sintered compact was examined, whereby it was observed that cBN particles were partially bonded in the samples ba-8, ba-9 and ba-13. In the samples ba-10, ba-11 and ba-12, on the other hand, fine cBN particles were filled into voids between or around coarse cBN particles, whereby the fine cBN particle were bonded by tee binders.

The aforementioned sintered compacts were machined into cutting tips, to cut SNCM-9 steel materials ($H_{RC}$: 58 to 60) having key ways in their outer peripheries. Cutting conditions were as follows:
Cutting Speed: 120 m/min.
Depth of Cut: 0.1 mm
Feed: 0.1 mm/rev.
Type: Dry Table 5-2 shows the results of the cutting test.

TABLE 5-1

| Sample | cBN Content (vol. %) | cBN Particle Size | Binder | |
|---|---|---|---|---|
| ba-8 | 65 | 4–6 μm (25%) | $Ti(C_{0.45},N_{0.55})_{0.73}$ | 57 wt. % |
| | | 2–4 μm (50%) | WC | 18 wt. % |
| | | smaller than 2 μm (25%) | Al | 25 wt. % |
| ba-9 | 70 | 4–6 μm (65%) | $Ti(C_{0.45},N_{0.55})_{0.73}$ | |
| | | 2–4 μm (10%) | WC | |
| | | smaller than 1 μm (25%) | Al | |
| ba-10 | 75 | 6–10 μm (35%) | $Ti(C_{0.45},N_{0.55})_{0.73}$ | |
| | | 2–4 μm (50%) | WC | |
| | | 1–2 μm (15%) | Al | |
| ba-11 | 73 | 10–15 μm (50%) | $Ti(C_{0.45},N_{0.55})_{0.73}$ | |
| | | 4–6 μm (50%) | WC | |
| | | | Al | |
| *ba-12 | 70 | 4–6 μm (65%) | $(Ti_{0.65},W_{0.35})(C_{0.5},N_{0.5})_{0.7}$ | 52 wt. % |
| | | 2–4 μm (10%) | WC | 18 wt. % |
| | | smaller than 1 μm (25%) | Al | 30 wt. % |
| *ba-13 | 70 | 4–6 μm (65%) | $TiC_{0.7}$ | 64 wt. % |
| | | 2–4 μm (10%) | WC | 6 wt. % |
| | | smaller than 1 μm (25%) | Al | 30 wt. % |

*Comparative sample; atomic ratio Ti:M is out of bounds of invention

TABLE 5-2

| Sample | Time to Breaking of Tip |
|---|---|
| ba-8 | 90 min. |
| ba-9 | 104 min. |
| ba-10 | 115 min. |
| ba-11 | 65 min. |
| *ba-12 | 8 min. |
| *ba-13 | 15 min. |

*Comparative sample

EXAMPLE 6

A continuous cutting test was performed on work pieces of SKD-11 steel material to examine the abrasion resistance of the sintered compacts obtained from Examples 4 and 5.

The hardness of the work piece was $H_{RC}$ 60. Cutting conditions were as follows:
Cutting Speed: 100 m/min.
Depth of Cut: 0.2 mm
Feed: 0.1 mm/rev.
Type: Dry
Cutting Period: 10 min.

Figure 2:
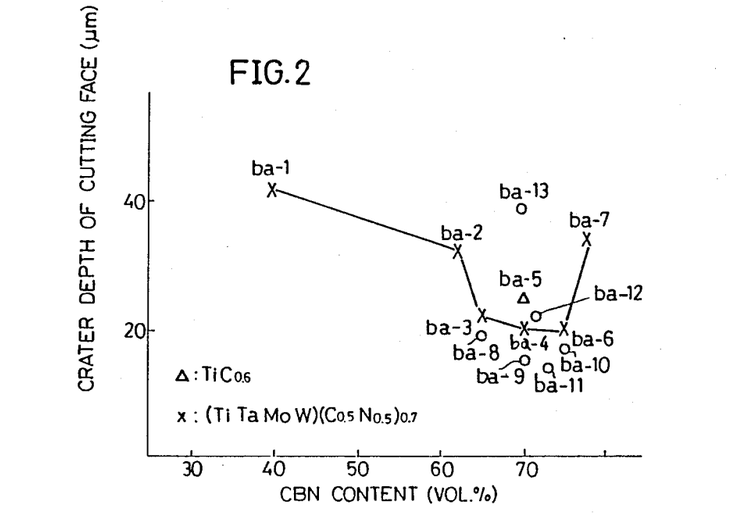
FIG. 2 is a graph showing the results of a cutting test based on Example 6.

FIG. 2 shows the crater wear depth of the rake face. Note that there is no Table 6 associated with this Example 6.

EXAMPLE 7

Carbide and carbo-nitride powder materials containing Ti were mixed with aluminum powder and tungsten carbide powder, which were previously heated at a high temperature of 1200° C. and preliminarily pulverized by a ball mill of cemented carbide, in order to obtain binder powder materials having an average particle size smaller than 1 μm, as listed in Table 7-1. The so obtained binder powder materials were mixed with 70 percent by volume of cBN powder containing cBN particles of sizes 4 to 10 μm, 2 to 4 μm and smaller than 2 μm in the ratio of 5:4:1, respectively, and 30 percent by volume of binder. The mixed materials were inserted into Mo vessels similarly to Example 4, to be sintered at a pressure of 40 Kb and a temperature of 1200° C.

The sintered compacts thus obtained were identified through X-ray diffraction, to observe peaks considered to be those of $AlB_2$, $AlN$, boride of W and/or W and WC in addition to peaks of cBN and carbo-nitride containing Ti in the sintered compacts prepared from the binders ba-14 to ba-19, which are within the scope of the present invention. On the other hand, a peak of Al$_3$Ti was observed in addition to the aforementioned peaks in the sintered compact prepared from the binder ba-20. Furthermore, a large peak of WC was observed in the compact obtained by using the binder ba-21. A peak of Ti$_3$Al was observed in the sintered compact including the binder ba-22. A peak of Al$_3$Ti was observed in the sintered compact including the binder ba-23.

The structure of each sintered compact was observed to find that fine cBN particles were dispersed through the binder around or in voids between coarse cBN particles.

Then the respective sintered compacts were used to make cutting tools for performing a cutting test on materials to be cut. The cut materials were SUJ-2 steel materials (H$_{RC}$: 59 to 61) each being in the form of a cylinder with an inner diameter of 25 mm, having a key way in the inner peripheral surface. Cutting conditions were as follows:

Cutting Speed: 150 m/min.
Depth of Cut: 0.2 mm
Feed: 0.15 mm/rev.

Table 7-2 shows the results of the cutting test.

TABLE 7-1

| Binder | Composition of Binder | Ti:M |
|---|---|---|
| ba-14 | 55(Ti$_{0.9}$,Zr$_{0.1}$)(C$_{0.9}$,N$_{0.1}$)$_{0.75}$ 10WC, 35Al | 85:15 = 5.67 |
| ba-15 | 55(Ti$_{0.8}$,V$_{0.2}$)(C$_{0.8}$,N$_{0.2}$)$_{0.70}$ 5WC, 40Al | 78:22 = 3.55 |
| ba-16 | 65(Ti$_{0.75}$,Hf$_{0.25}$)(C$_{0.7}$,N$_{0.3}$)$_{0.70}$ 5WC, 30Al | 72:28 = 2.57 |
| ba-17 | 67(Ti$_{0.9}$,Cr$_{0.1}$)(C$_{0.6}$,N$_{0.4}$)$_{0.8}$ 8WC, 25Al | 87:13 = 6.69 |
| ba-18 | 45(Ti$_{0.95}$,W$_{0.05}$)(C$_{0.8}$,N$_{0.2}$)$_{0.60}$ 10WC 45Al | 89:11 = 8.09 |
| ba-19 | 40(Ti$_{0.8}$,W$_{0.2}$)(C$_{0.7}$,N$_{0.3}$)$_{0.53}$ 10WC, 50Al | 72:28 = 2.57 |
| *ba-20 | 35(Ti$_{0.7}$,W$_{0.3}$)(C$_{0.9}$,N$_{0.1}$)$_{0.8}$ 10WC, 55Al | 61:39 = 1.56 |
| *ba-21 | 20Ti(C$_{0.7}$,N$_{0.3}$)$_{0.7}$ 50WC, 30Al | 41:59 = 0.69 |
| *ba-22 | 50Ti(C$_{0.8}$,N$_{0.2}$)$_{0.45}$ 10WC, 40Al | 95:5 = 19.00 |
| *ba-23 | 50Ti(C$_{0.8}$,N$_{0.2}$)$_{0.88}$ 10WC, 40Al | 94:6 = 15.67 |
| *ba-24 | 72(Ti$_{0.8}$,W$_{0.2}$)C$_{0.7}$ 10WC, 18Al | 76:24 = 3.17 |

*Comparative sample; underlined parameters are outside of bounds of the invention.

TABLE 7-2

| Sample | Time Capable of Cutting |
|---|---|
| ba-14 | 62 min. |
| ba-15 | 58 min. |
| ba-16 | 45 min. |
| ba-17 | 38 min. |
| ba-18 | 59 min. |
| ba-19 | 50 min. |
| *ba-20 | 10 min. |
| *ba-21 | 2 min. |
| *ba-22 | 5 min. |
| *ba-23 | 3 min. |
| *ba-24 | 6 min. |

*Comparative sample

EXAMPLE 8

(Ti$_{0.9}$,W$_{0.1}$)(C$_{0.9}$,N$_{0.1}$)$_{0.85}$, TiAl$_3$ and WC were mixed in the weight ratio of 4:5:1 to be uniformalized at a temperature of 1300° C. for one hour in a nitrogen gas atmosphere at a pressure of 1 Torr. The powder thus obtained was pulverized in a pot with a ball of cemented carbide to obtain an average particle size smaller than 1 μm. The binder thus obtained was analyzed and it was found that it contained 30 percent by weight of Al. The atomic ratio of Ti to W was 87:13, where W is the transition metal M here.

The aforementioned binder was mixed with cBN powder having a particle size smaller than 6 μm, in the volume ratio of 30:70 and filled into an Mo vessel to be sintered at a pressure of 50 Kb and a temperature of 1350° C. for 15 minutes.

The sintered compact thus obtained was identified through X-ray diffraction, whereby it was observed that the compact exhibited peaks considered to be those of cBN, (Ti,W)(C,N), AlB$_2$, AlN, TiN and WB$_2$. No Al$_3$Ti was observed.

This sintered compact was used to make cutting tools to perform a cutting test similarly to Example 4, whereby it was determined that the performance of this cutting tip was about 3.2 times that of the sample ba-2 of Example 4 shown in FIG. 1. Note that there is no Table 8 corresponding to this Example 8.

EXAMPLE 9

Nitride powder and carbo-nitride powder materials containing Ti were mixed with aluminum powder and WC powder and pulverized by means of a pot and ball of cemented carbide to prepare binder powder materials having an average particle size smaller than 1 μm as listed in Table 9-1. No WC powder was mixed in the sample ca-7 shown in Table 9-1. These binder powder materials were mixed in the volume ratio of 30:70 with cBN powder obtained by mixing cBN particles having sizes of 8 to 6 μm and 2 to 3 μm in the ratio of 2:1 to prepare a mixture of powder materials. The powder mixtures were filled into Mo vessels along with discs of cemented carbide with a composition of WC-12 wt. % Co. Then each filled vessel was placed into a high pressure/temperature apparatus for sintering the powder mixture at a pressures of 50 Kb and a temperature of 1280° C. for 15 minutes.

The sintered compacts thus obtained were examined through X-ray diffraction. It was observed that the compacts showed peaks considered to be those of cBN, nitride or carbo-nitride containing Ti, TiB$_2$, AlB$_2$, AlN and boride of W or W in the samples ca-1 to ca-7. Peaks of cBN, (Ti,W)(C,N), AlB$_2$, AlN, WC and a small amount of TiB$_2$ were observed in the sample ca-8. Peaks of cBN, TiN, AlB$_2$, AlN and TiB$_2$ were detected in the sample ca-9 and peaks of cBN, TiB$_2$, WB$_2$ and small amounts of AlN and AlB$_2$ were detected in the sample ca-10. Peaks of cBN, (Ti,W)(C,N), TiB$_2$, AlB$_2$, AlN, WB, and Al$_3$Ti were detected in the sample ca-11. Peaks considered to be those of cBN, (Ti,W)(C,N), TiB$_2$, AlB$_2$, AlN, WB and WC were detected in the sample ca-12.

Then the structure of each sintered compact was observed by means of a scanning electron microscope. It was seen that fine cBN particles were present in the voids between or around coarse cBN particles throughout the bonding phases.

Table 9-2 shows the Vickers hardness of the aforementioned sintered compacts. Cutting tools were prepared from the sintered compacts and used to perform a cutting test. Each sample to be cut was a cylinder of steel SCM-440 (H$_{RC}$: 59 to 62) 80 mm in diameter having four grooves in the outer periphery. Cutting conditions were as follows:
Cutting Speed: 130 m/min.
Depth of Cut: 0.15 mm
Feed: 0.10 mm/rev.

Table 9-2 also shows the measured time durations between the start of the cutting and the breaking of the tips.

TABLE 9-1

| Sample | Composition of Binder | | | Ti:M |
|---|---|---|---|---|
| ca-1 | 60Ti,N$_{0.7}$ | 25Al, | 15WC | 93:7 = 13.29 |
| ca-2 | 50(Ti$_{0.8}$,Zr$_{0.2}$)(C$_{0.2}$,N$_{0.8}$)$_{0.7}$ | 35Al, | 15WC | 72.6:27.4 = 2.65 |
| ca-3 | 65(Ti$_{0.85}$,Ta$_{0.1}$,W$_{0.05}$)(C$_{0.15}$,N$_{0.85}$)$_{0.6}$ | 30Al, | 5WC | 82.5:17.5 = 4.71 |
| ca-4 | 62(Ti$_{0.80}$,Hf$_{0.10}$,Mo$_{0.10}$)(C$_{0.1}$,N$_{0.9}$)$_{0.7}$ | 28Al, | 10WC | 75.3:24.7 = 3.05 |
| ca-5 | 70(Ti$_{0.75}$,Nb$_{0.10}$,V$_{0.15}$)(C$_{0.25}$,N$_{0.75}$)$_{0.8}$ | 25Al, | 5WC | 73.3:26.7 = 2.75 |
| ca-6 | 65(Ti$_{0.85}$,Cr$_{0.15}$)(C$_{0.2}$,N$_{0.8}$)$_{0.83}$ | 30Al, | 5WC | 83.0:17.0 = 4.88 |
| ca-7 | 70(Ti$_{0.7}$,W$_{0.3}$)(C$_{0.3}$,N$_{0.7}$)$_{0.8}$ | 30Al | | 70:30 = 2.33 |
| *ca-8 | 65(Ti$_{0.7}$, W$_{0.3}$)(C$_{0.2}$,N$_{0.8}$)$_{0.7}$ | 25Al, | 10WC | 65:35 = 1.86 |
| *ca-9 | 72Ti,N$_{0.7}$ | 25Al, | 3WC | 98.8:1.2 = 82.33 |
| *ca-10 | 72(Ti$_{0.8}$,W$_{0.2}$)(C$_{0.2}$,N$_{0.8}$)$_{0.8}$ | 18Al, | 10WC | 75.5:24.5 = 3.08 |
| ca-11 | 53(Ti$_{0.8}$,W$_{0.2}$)(C$_{0.2}$,N$_{0.8}$)$_{0.8}$ | 37Al, | 10WC | 74.0:26.0 = 2.85 |
| ca-12 | 70(Ti$_{0.9}$,W$_{0.1}$)(C$_{0.4}$,N$_{0.6}$)$_{0.8}$ | 20Al, | 10WC | 85.5:14.5 = 5.90 |

*Comparative sample; underlined parameters are outside of bounds of the invention

TABLE 9-2

| Sample | Vickers Hardness | Cutting Time to Breaking of Tip (min.) |
|---|---|---|
| ca-1 | 3400 | 58 |
| ca-2 | 3450 | 61 |
| ca-3 | 3500 | 53 |
| ca-4 | 3450 | 51 |
| ca-5 | 3450 | 61 |
| ca-6 | 3500 | 48 |
| ca-7 | 3550 | 63 |
| *ca-8 | 3500 | 25 |
| *ca-9 | 3400 | 18 |
| *ca-10 | 3450 | 23 |
| ca-11 | 3200 | 32 |
| ca-12 | 3500 | 33 |

*Comparative sample

EXAMPLE 10

(Ti$_{0.85}$,W$_{0.15}$)(C$_{0.1}$,N$_{0.9}$)$_{0.75}$, Al and WC powder were mixed and pulverized to obtain binder powder with particle sizes smaller than 1 μm. The composition of this powder was 60% (Ti$_{0.85}$, W$_{0.15}$)(C$_{0.1}$,N$_{0.9}$)$_{0.75}$-33 wt. % Al-7 wt. % WC. The atomic ratio of Ti to W in the binder was 81.7:18.3, where W is the metal M.

This binder powder material was mixed with cBN powder materials in the ratios as listed in Table 10-1, and the mixtures were then sintered at a superhigh pressure similarly to Example 9.

Respective sintered compacts thus obtained were used to make cutting tools for cutting sample work pieces in a cutting test. The work pieces were round bars of SUJ-3 materials (H$_{RC}$: 58 to 62) 480 mm in diameter having four holes 4.5 mm in diameter provided in the outer peripheral surface at axial intervals of 10 mm along the circumferential direction. Cutting conditions were as follows:
Cutting Speed: 120 m/min.
Depth of Cut: 0.2 mm
Feed: 0.08 mm/rev.

Table 10-2 shows the results of the cutting tests as measured cutting times between the start of a cutting operation and the breaking of the respective tips.

TABLE 10-1

| Sample | cbN Particle Size (Compounding Ratio) | Content (vol. %) |
|---|---|---|
| ca-13 | 20–30 μm (30) 10–20 μm (50) smaller than 5 μm (20) | 75 |
| ca-14 | 10–20 μm (30) | 70 |
| ca-15 | smaller than 10 μm (70) 8–10 μm (50) 3–4 μm (30) smaller than 2 μm (20) | 65 |
| ca-16 | 8–10 μm (70) 3–4 μm (30) | 70 |
| ca-17 | 8–10 μm (100) | 70 |
| ca-18 | 6–8 μm (80) smaller than 4 μm (20) | 65 |
| ca-19 | 6–8 μm (75) smaller than 4 μm (25) | 60 |
| ca-20 | 6–8 μm (75) smaller than 4 μm (25) | 75 |
| *ca-21 | 6–8 μm (75) smaller than 4 μm (25) | 78 |

*Comparative sample; underlined parameter is outside of bounds of the invention

TABLE 10-2

| Sample | Time to Breaking of Tip (min.) |
|---|---|
| ca-13 | 45 |
| ca-14 | 56 |
| ca-15 | 63 |
| ca-16 | 65 |
| ca-17 | 40 |
| ca-18 | 70 |
| ca-19 | 18 |
| ca-20 | 48 |
| *ca-21 | 15 |

*Comparative sample

EXAMPLE 11

Binder materials as listed in Table 11-1 were prepared. These binder materials were mixed in the volume ratio of 30:70 with cBN powder materials each containing particles in the size ranges of 6 to 8 μm, 3 to 5 μm and smaller than 2 μm, in the ratio of 5:3:2, to prepare powder mixtures which were filled into Mo vessels to be sintered at a superhigh pressure of 50 Kb at a temperature of 1300° C.

The sintered compacts thus obtained were subjected to X-ray diffraction, whereby it was observed that the compacts exhibited peaks representative of substances as shown in Table 11-2.

The respective sintered compacts were used to make cutting tools, for cutting round test bars of SKD-11 material (H$_{RC}$: 60 to 63) each having axial grooves in four portions on the outer peripheral surface. Cutting conditions were as follows:
Cutting Speed: 120 m/min.
Depth of Cut: 0.2 mm
Feed: 0.2 mm/rev.
Table 11-2 also shows the results of the cutting test.

TABLE 11-1

| Sample | Composition of Binder (wt. %) | Ti:M |
|---|---|---|
| ca-22 | 60(Ti$_{0.85}$,W$_{0.15}$)(C$_{0.1}$,N$_{0.9}$)$_{0.85}$ 40Al$_3$Ti | 89.4:10.6 = 8.43 |
| ca-22 | 75(Ti$_{0.9}$,W$_{0.1}$)(C$_{0.1}$,N$_{0.9}$)$_{0.8}$ 25Al | 90:10 = 9.00 |
| *ca-24 | 60(Ti$_{0.85}$,W$_{0.15}$)(C$_{0.1}$,N$_{0.9}$)$_{\underline{0.88}}$ 30Al, 10WC | 79.6:20.4 = 3.90 |
| *ca-25 | 65(Ti$_{0.9}$,W$_{0.1}$)(C$_{0.1}$,N$_{0.9}$)$_{\underline{0.48}}$ 25Al, 10WC | 85.4:14.6 = 5.85 |
| ca-26 | 45TiN$_{0.75}$,40Al$_3$Ti,15WC | 91.0:9.0 = 10.11 |

*Comparative sample; underlined parameter is out of bounds of the invention

TABLE 11-2

| Sample | Result of X-Ray Diffraction | Time to Breaking Tip (min.) |
|---|---|---|
| ca-22 | cBN,(Ti,W)(C,N), TiB$_2$,AlB$_2$,AlN, WB$_2$ | 26 |
| ca-23 | cBN,(Ti,W)(C,N), TiB$_2$,AlB$_2$,AlN, WB$_2$, W | 30 |
| *ca-24 | cBN, (Ti,W)(C,N) TiB$_2$,AlB$_2$,AlN, WC | 5 |
| *ca-25 | cBN,(Ti,W)(C,N) TiB$_2$, AlB$_2$,AlN,W, Ti$_3$Al | 7 |
| ca-26 | cBN,(Ti,W)(C,N), TiB$_2$, AlB$_2$,AlN,WB$_2$,W | 33 |

*Comparative sample

EXAMPLE 12

Nitride or carbo-nitride powder containing Ti was mixed with aluminum powder and WC powder and pulverized by means of a pot and a ball of cemented carbide to prepare binder powder materials each having average particle sizes smaller than 1 μm as listed in Table 12-1. These binder powder materials were mixed in the volume ratio of 45:55 with cBN powder materials each having particle sizes smaller than 1.5 μm to prepare a mixture of powder materials. The mixtures were filled into Mo vessels along with discs of cemented carbide of WC-10wt.%Co. Then each vessel was placed into a superhigh pressure/temperature apparatus for sintering the mixture at a pressure of 53 Kb and a temperature of 1350° C. for 30 minutes.

The sintered compacts were subjected to X-ray diffraction, whereby peaks of cBN, carbide, nitride and carbo-nitride containing Ti were observed in every sintered compact. Peaks considered as those of TiB$_2$, AlB$_2$ and AlN and boride of W or W were recognized in addition to the aforementioned substances in the samples da-1 to da-7. Further, peaks considered as those of AlB$_2$, AlN, WC, boride of W and a small amount of TiB$_2$ were observed in the sample da-8 in addition to the peaks of cBN and (Ti,W)(C,N). Peaks of cBN, Ti(C,N), TiB$_2$, AlB$_2$, and AlN were observed in the sample da-9. Peaks considered as those of cBN, (Ti,W)(C,N), TiB$_2$ and boride of W and a small amount of AlB$_2$ and AlN were observed in the sample da-10. Peaks of cBN, (Ti,W)(C,N), AlN, AlB$_2$, TiB$_2$, boride of W, W and Al$_3$Ti were observed in the sample da-11.

Then the structure of each sintered compact was observed by means of a scanning type electron microscope. It was found that fine cBN particles were mutually bonded to each other by the bonding phases. Table 12-2 shows the results of Vickers hardness measurements of these sintered compacts.

The respective sintered compacts were used to make cutting tools to cut round bars of SNCM-415 materials (H$_{RC}$: 58 to 61) 100 mm in diameter each having two axial grooves in the outer peripheral surface. Cutting conditions were as follows:
Cutting Speed: 80 m/min.
Depth of Cut: 0.2 mm
Feed: 0.15 mm/rev.
Type: Dry Table 12-2 also shows the results of tool life time or the times measured between the beginning of the cutting and the breaking of the tips.

TABLE 12-1

| Sample | Composition of Binder (wt. %) | | | Ti:M |
|---|---|---|---|---|
| da-1 | 60 TiN$_{0.7}$ | 25Al, | 15WC | 93:7 = 13.29 |
| da-2 | 60TiC$_{0.65}$ | 30Al, | 10WC | 95:4.5 = 21.22 |
| da-3 | 55(Ti$_{0.9}$,W$_{0.1}$)(C$_{0.5}$,N$_{0.5}$)$_{0.75}$ | 35Al, | 10WC | 84.3:15.7 = 5.37 |
| da-4 | 60(Ti$_{0.8}$,Ta$_{0.1}$,Mo$_{0.05}$,W$_{0.05}$)(C$_{0.7}$,N$_{0.3}$)$_{0.8}$, | 30Al, | 10WC | 74.9:24.1 = 2.98 |
| da-5 | 50(Ti$_{0.8}$,Zr$_{0.2}$)(C$_{0.2}$,N$_{0.8}$)$_{0.73}$ | 40Al, | 10WC | 74.9:25.1 = 2.98 |
| da-6 | 55(Ti$_{0.9}$,V$_{0.05}$,Hf$_{0.05}$)(C$_{0.6}$,N$_{0.4}$)$_{0.68}$, | 35Al, | 10WC | 84.7:15.3 = 5.54 |
| da-7 | 55(Ti$_{0.85}$,Nb$_{0.10}$,Cr$_{0.05}$)(C$_{0.9}$,N$_{0.1}$)$_{0.63}$, | 25Al, | 20WC | 75.9:24.1 = 3.15 |
| *da-8 | $\underline{50}$(Ti$_{0.75}$,W$_{\underline{0.25}}$)(C$_{0.7}$,N$_{0.3}$)$_{0.7}$, | 30Al, | 20WC | 62.6:37.4 = 1.67 |
| *da-9 | 72Ti(C$_{0.5}$,N$_{0.5}$)$_{0.7}$ | 25Al, | 3WC | 98.7:1.3 = 75.92 |
| *da-10 | 72(Ti$_{0.8}$,W$_{0.2}$)(C$_{0.6}$,N$_{0.4}$)$_{0.7}$ | $\underline{18Al,}$ | 10WC | 75.2:24.8 = 3.03 |
| *da-11 | 37(Ti$_{0.9}$,W$_{0.1}$)(C$_{0.1}$,N$_{0.9}$)$_{0.75}$ | $\underline{53Al,}$ | 10WC | 81.4:18.6 = 4.38 |

*Comparative sample; underlined parameters are out of bounds of the invention

TABLE 12-2

| Sample | Vickers Hardness | Time to Breaking of Tip (min.) |
|---|---|---|
| da-1 | 3200 | 75 |
| da-2 | 3250 | 55 |
| da-3 | 3300 | 63 |
| da-4 | 3300 | 82 |
| da-5 | 3200 | 68 |
| da-6 | 3250 | 71 |
| da-7 | 3200 | 66 |
| *da-8 | 3300 | 13 |
| *da-9 | 3000 | 20 |
| *da-10 | 3100 | 25 |
| *da-11 | 2800 | 3 |

*Comparative sample

EXAMPLE 13

(Ti$_{0.9}$,W$_{0.1}$)(C$_{0.1}$,N$_{0.9}$)$_{0.7}$, Al and WC powder were mixed to obtain a binder powder with particle sizes smaller than 1 μm. The composition of the binder powder was 57 wt. % (Ti$_{0.9}$,W$_{0.1}$), C$_{0.1}$N$_{0.9}$)$_{0.7}$-33 wt. %

Al-10 wt. % WC. The atomic ratio of Ti to W in the binder was 84.6:15.4. These powder binder materials were mixed with cBN powder materials as listed in Table 13-1 to prepare powder mixtures. Referring to Table 13-1 for example, the sample da-18 was prepared with cBN powder having particles within the size range of 3 to 5 μm.

The mixed powder materials thus obtained were sintered at a superhigh pressure similarly to Example 12 to form sintered compacts. These sintered compacts were machined into cutting tools for cutting end surface of round bars of SKD11 ($H_{RC}$: 60 to 62) 100 mm in diameter. Cutting conditions were as follows:

Cutting Speed: 150 m/min.
Depth of Cut: 0.5 mm
Feed: 0.1 mm/tip
Type: Dry

Table 13-2 shows the number of times each respective sintered compact cutting tool was capable of cutting before breaking.

TABLE 13-1

| Sample | cBN Particle Size | Content (vol. %) |
|---|---|---|
| da-12 | smaller than 2 μm | 65 |
| da-13 | 1~2 μm | 60 |
| da-14 | smaller than 1 μm | 55 |
| da-15 | smaller than 1 μm | 50 |
| da-16 | 1~2 μm | 68 |
| *da-17 | 1~2 μm | 45 |
| da-18 | 3~5 μm | 60 |

*Comparative sample; underlined parameter is outside of bounds of the invention

TABLE 13-2

| Sample | Number of Times Capable of Cutting |
|---|---|
| da-12 | 29 |
| da-13 | 28 |
| da-14 | 33 |
| da-15 | 31 |
| da-16 | 4 |
| *da-17 | 1 |
| da-18 | 8 |

*Comparative sample

EXAMPLE 14

Binder powder materials having particle sizes smaller than 1 μm were prepared as listed in Table 14-1. These binder powder materials were mixed in the volume ratio of 43:57 with cBN powder materials each having particle sizes smaller than 1 μm to obtain powder mixtures. These powder mixtures were placed into Mo vessels to be sintered at a superhigh pressure of 48 Kb and 1330° C. for 30 minutes. The respective sintered compacts thus obtained were examined by X-ray diffraction, which showed the presence of peaks of substances as shown in Table 14-2.

These sintered compacts were machined into cutting tools to perform a cutting test on work pieces in the form of SUJ-2 round bars ($H_{RC}$: 59 to 60) 80 mm in diameter each having four holes 6 mm in diameter axially separated at intervals of 10 mm in the diametrical direction. Cutting conditions were as follows:

Cutting Speed: 100 m/min.
Depth of Cut: 0.2 mm
Feed: 0.10 mm/rev.
Type: Dry

Table 14-2 also shows the cutting lifetime or period to breaking of each respective tip measured in the cutting test.

TABLE 14-1

| Sample | Composition of Binder (wt. %) | Ti:M |
|---|---|---|
| da-19 | $65(Ti_{0.85},Ta_{0.15})(C_{0.3},N_{0.7})_{0.80}$, $35Al_3Ti$ | 88.7:11.3 = 7.85 |
| da-20 | $70(Ti_{0.90},W_{0.10})(C_{0.5},N_{0.5})_{0.80}$, $30Al$ | 90:10 = 9.00 |
| *da-21 | $60(Ti_{0.85},W_{0.15})(C_{0.5},N_{0.5})_{\underline{0.87}}$, $30Al, 10WC$ | 79.6:20.4 = 3.90 |
| *da-22 | $65(Ti_{0.90},W_{0.10})(C_{0.3},N_{0.7})_{\underline{0.48}}$, $25Al, 10WC$ | 85.4:14.6 = 5.85 |
| da-23 | $45TiC_{0.8}, 40Al_3Ti, 15WC$ | 93.5:6.5 = 14.38 |

*Comparative sample; underlined parameter is out of bounds of the invention

TABLE 14-2

| Sample | Result of X-Ray Diffraction | Time to Breaking of Tip (min.) |
|---|---|---|
| da-19 | cBN, (Ti,Ta)(C,N) $TiB_2, AlB_2, AlN, WB_2$ | 35 |
| da-20 | cBN,(Ti,W)(C,N) $TiB_2, AlB_2, AlN,$ $WB_2, W$ | 86 |
| *da-21 | cBN,(Ti,W)(C,N) $TiB_2, AlB_2, AlN,$ $WB_2$ | 9 |
| *da-22 | cBN,(Ti,W)(C,N) $TiB_2, Ti_3Al, AlB_2,$ $AlN, W$ | 12 |
| da 23 | cBN,(Ti,W)(C,N) $TiB_2, AlB_2, AlN,$ $WB_2$ | 73 |

Comparative sample

Although the present invention has been described and illustrated in detail, it is clearly understood that the same is by way of illustration and example only and is not to be take by way of limitation, the spirit and scope of the present invention being limited only by the terms of the appended claims.

What we claim is:

1. A hard sintered compact for a tool obtained by sintering a mixture comprising about 50 to 75 percent by volume of cubic boron nitride and about 25 to 50 percent by volume of a binder under a high pressure, said binder comprising: aluminum in the form of at least one of pure Al and an Al compound, whereby the content of Al in said binder is about 20 to 50 percent by weight, one or more not yet sintered Ti compounds selected from the group consisting of $TiN_z$, $Ti(C,N)_z$, $TiC_z$, $(Ti,M)C_z$, $(Ti,M)(C,N)_z$ and $(Ti,M)N_z$, wherein the atomic ratio of the content of Ti to the content of M is within the range $2/1 \leq Ti/M \leq 97/3$, and tungsten in the form of at least one of pure W and a W compound selected from the group consisting of WC, $(Ti,W)C_z$, $(Ti,W)(C,N)_z$, $(Ti,W)N_z$, $(Ti,W,M)C_z$, $(Ti,W,M)(C,N)_z$ and $(Ti,W,M)N_z$, whereby the total concentration of tungsten in said binder is about 4 to 40 percent by weight, wherein M indicates a transition metal of the group IVb, Vb or VIb of the periodic table excepting Ti, and z is within a range of $0.5 \leq z \leq 0.85$.

2. The hard sintered compact of claim 1, wherein said hard sintered compact contains at least one of cubic boron nitride, TiN, Ti(C,N), TiC, (Ti,M)C, (Ti,M)(C,N), (Ti,M)N, titanium boride, aluminum boride, aluminum nitride, a tungsten compound and tungsten.

3. The hard sintered compact of claim 1, wherein said sintered compact comprises continuous bonding phases and fine cubic boron nitride particles filled around or in voids between coarse cubic boron nitride particles.

4. The hard sintered compact of claim 1, wherein said tungsten is present in the form of at least one of tungsten boride and tungsten carbide, after sintering said mixture.

5. The hard sintered compact of claim 1, wherein said Al is present in the form of an Al compound.

6. The hard sintered compact of claim 1, comprising about 65 to 75 percent by volume of said cubic boron nitride, said binder comprising about 20 to 35 percent by weight of Al, said Ti compound being expressed as $(TiC_z,MC)_y-(MN)_{1-y}$ or $(Ti,M)(C_y,N_{1-y})$, wherein y is within the range of $0 < y \leq 0.3$.

7. The hard sintered compact of claim 1, comprising about 65 to 75 percent by volume of said cubic boron nitride, said binder comprising about 25 to 50 percent by weight of Al, said Ti compound being expressed as $(TiC_z,MC)_y-(MN)_{1-y}$ or $(Ti,M)(C_y,N_{1-y})$, wherein y is within the range of $0.3 < y < 1.0$.

8. The hard sintered compact of claim 1, comprising about 50 to 65 percent by volume of said cubic boron nitride initially present in powder form having an average particle size smaller than about 2 μm.

9. The hard sintered compact of claim 8, wherein said cubic boron nitride powder has an average particle size smaller than about 1 μm.

10. A method of manufacturing a hard sintered compact for a tool comprising: mixing about 50 to 75 percent by volume of cubic boron nitride powder with about 25 to 50 percent by volume of binder to obtain a mixed powder, said binder comprising about 20 to 50 percent by weight of Al in the form of at least one of pure Al and an Al compound, one or more not yet sintered Ti compounds selected from the group consisting of $TiN_z$, $Ti(C,N)_z$, $TiC_z$, $(Ti,M)C_z$, $(Ti,M)(C,N)_z$ and $(Ti,M)N_z$, wherein the atomic ratio of the content of Ti to the content of M is about $$2/1 \leq Ti/M \leq 97/3, \text{ and}$$

tungsten in the form of at least one of pure W and a W compound selected from the group consisting of WC, $(Ti,W)C_z$, $(Ti,W)(C,N)_z$, $(Ti,W)N_z$, $(Ti,W,M)C_z$, $(Ti,W,M)(C,N)_z$ and $(Ti,W,M)N_z$, whereby the total concentration of tungsten in said binder is about 4 to 40 percent by weight, wherein M indicates a transition metal of the group IVb, Vb or VIb of the periodic table excepting Ti, and z is within a range of $0.5 \leq z \leq 0.85$, and further comprising sintering said mixed powder under cBN-stable superhigh pressure conditions.

11. The method of claim 10, wherein said tungsten is present in the form of at least one of tungsten boride and tungsten carbide, after said sintering step.

12. The method of claim 10, wherein said Al is present in the form of an Al compound.

13. The method of claim 10, wherein said mixed powder comprises about 65 to 75 percent by volume of said cubic boron nitride, said binder comprising about 20 to 35 percent by weight of Al, wherein said Ti compound is expressed as $(TiC_z,MC)_y-(MN)_{1-y}$ or $(Ti,M)(C_y,N_{1-y})$, and wherein y is within the range of $0 < y = 0.3$.

14. The method of claim 10, wherein said mixed powder comprises about 65 to 75 percent by volume of said cubic boron nitride, said binder comprising about 25 to 50 percent by weight of Al, wherein said Ti compound is expressed as $(TiC_z,MC)_y-(MN)_{1-y}$ or $(Ti,M)(C_y,N_{1-y})$, and wherein y is within the range of $0.3 < y < 1.0$.

15. The method of claim 10, wherein said mixed powder comprises about 50 to 65 percent by volume of said cubic boron nitride powder having an average particle size smaller than about 2 μm.

16. The method of claim 15, wherein said cubic boron nitride powder has an average particle size smaller than about 1 μm.

* * * * *

UNITED STATES PATENT AND TRADEMARK OFFICE
CERTIFICATE OF CORRECTION

PATENT NO. : 4,911,756                                    Page 1 of 3

DATED : March 27, 1990

INVENTOR(S) : Tetsuo Nakai; Mitsuhiro Goto

It is certified that error appears in the above-identified patent and that said Letters Patent is hereby corrected as shown below:

in [57] ABSTRACT, line 7, replace "$TiC_2$" by --$TiC_z$--;

line 9, replace "IVa, Va or VIa" by --IVb, Vb or VIb--.

Column 6, Table 2, under the heading "Composition of Binder" underline "$0.4$" (in line 1).

Column 8, Table 4, in the first heading of Table 4, replace "Con-    WC in" by --Content--.

Column 10, Table 5-1, last column on the right should read as follows in lines 4 to 12:
--57 wt.%
  18 wt.%
  25 wt.%
  57 wt.%
  18 wt.%
  25 wt.%
  57 wt.%
  18 wt.%
  25 wt.%--.

Column 11, Table 7-1, under the heading "Composition of Binder", the following are to be underlined: line 14, --55Al--;
                                                         line 16, --50WC--;
                                                         line 17, --0.45--;
                                                         line 19, --0.88--;
                                                         line 22, --18Al--.

UNITED STATES PATENT AND TRADEMARK OFFICE
CERTIFICATE OF CORRECTION

PATENT NO. : 4,911,756  
DATED : March 27, 1990  
INVENTOR(S) : Tetsuo Nakai; Mitsuhiro Goto Page 2 of 3

It is certified that error appears in the above-identified patent and that said Letters Patent is hereby corrected as shown below:

Column 11, Table 7-1, under the heading "Ti:M" please underline the following:
line 7, "61:39 = 1.56";
line 8, "41:59 = 0.69".

Column 13, Table 9-1, Under the heading "Composition of Binder"
line 8, replace "$\underline{65}(Ti_{0.7}, W_{\underline{0.3})(}C_{0.2}, N_{0.8})_{0.7}$" by
--$\underline{65}(Ti_{0.7}, W_{\underline{0.3}})(C_{0.2}, N_{0.8})_{0.7}$--.

Column 15, Table 11-1, first column, line 2, replace "ca-22" by --ca-23--.

Column 16, Table 12-1, under the heading "Ti:M", line 4,
replace "74.9:24.1 = 2.98" by --74.9:25.1 = 2.98--.

Column 18, Table 14-2, under the heading "Result of X-Ray Diffraction",
line 10, replace "$Ti_3,Al,$" by --$Ti_3Al$,--;

last line, replace "Comparative sample" by
--*Comparative sample--.

Column 20, line 6 of claim 13, replace "$0 < y = 0.3.$" by --$0 < y \leqq 0.3$--.

UNITED STATES PATENT AND TRADEMARK OFFICE
CERTIFICATE OF CORRECTION

PATENT NO. : 4,911,756

DATED : March 27, 1990

INVENTOR(S) : Tetsuo Nakai; Mitsuhiro Goto

It is certified that error appears in the above-identified patent and that said Letters Patent is hereby corrected as shown below:

Column 20, line 5 of claim 14, replace "$TiC_z, MC)_y-(MN)_{1-y}$" by $$--TiC_z, MC)_y-(MN)_{1-y}--.$$

Signed and Sealed this

First Day of October, 1991

Attest:

HARRY F. MANBECK, JR.

Attesting Officer    Commissioner of Patents and Trademarks